United States Patent
Takazawa

(10) Patent No.: US 9,400,562 B2
(45) Date of Patent: Jul. 26, 2016

(54) IMAGE PROJECTION DEVICE, IMAGE PROJECTION SYSTEM, AND CONTROL METHOD

(71) Applicant: Kazuhiro Takazawa, Tokyo (JP)

(72) Inventor: Kazuhiro Takazawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 228 days.

(21) Appl. No.: 14/133,853

(22) Filed: Dec. 19, 2013

(65) Prior Publication Data

US 2014/0198030 A1    Jul. 17, 2014

(30) Foreign Application Priority Data

Jan. 16, 2013    (JP) .................................. 2013-005592

(51) Int. Cl.
| | | |
|---|---|---|
| *G06F 3/01* | (2006.01) | |
| *G06K 9/00* | (2006.01) | |
| *G06F 3/03* | (2006.01) | |
| *G06K 9/20* | (2006.01) | |
| *G03B 17/54* | (2006.01) | |

(52) U.S. Cl.
CPC ................ *G06F 3/017* (2013.01); *G03B 17/54* (2013.01); *G06F 3/0304* (2013.01); *G06K 9/00335* (2013.01); *G06K 9/2036* (2013.01)

(58) Field of Classification Search
CPC ....................................................... G06F 3/017
See application file for complete search history.

(56) References Cited

U.S. PATENT DOCUMENTS

| | | | | |
|---|---|---|---|---|
| 2011/0246877 | A1* | 10/2011 | Kwak ................... | G06F 3/0488 715/702 |
| 2012/0026113 | A1* | 2/2012 | Kasahara ............ | G06F 3/04883 345/173 |
| 2012/0119988 | A1* | 5/2012 | Izumi ..................... | G06F 3/017 345/156 |
| 2013/0249788 | A1 | 9/2013 | Mitsui et al. | |

FOREIGN PATENT DOCUMENTS

| | | |
|---|---|---|
| JP | 2008-287142 | 11/2008 |
| JP | 2010128102 A * | 6/2010 |
| JP | 2012-003521 | 1/2012 |

OTHER PUBLICATIONS

U.S. Appl. No. 13/874,648, filed May 1, 2013.

* cited by examiner

*Primary Examiner* — Gerald Johnson
*Assistant Examiner* — Maheen Javed
(74) *Attorney, Agent, or Firm* — Oblon, McClelland, Maier & Neustadt, L.L.P.

(57) ABSTRACT

An image projection device for projecting an image on a projection object includes a detecting unit configured to detect a detection object present within an object space corresponding to the image projected by the image projection device; a recognizing unit configured to recognize an instruction motion of a user based on detection of the detection object by the detecting unit; and an output unit configured to generate an output corresponding to the instruction motion recognized within the object space by the recognizing unit from the instruction motion and the image projected by the image projection device.

17 Claims, 14 Drawing Sheets

IMAGE PROJECTION DEVICE, IMAGE PROJECTION SYSTEM, AND CONTROL METHOD

CROSS-REFERENCE TO RELATED APPLICATION

The present application claims priority to and incorporates by reference the entire contents of Japanese Patent Application No. 2013-005592 filed in Japan on Jan. 16, 2013.

BACKGROUND OF THE INVENTION

1. Field of the Invention

The present invention relates to an image projection device, an image projection system, and a control method.

2. Description of the Related Art

One known technique for operating a projector or a device connected to the projector in a more intuitive manner is to directly touch a video image projected by the projector as if the video image were a touch panel or by making a gesture (a motion such as a hand gesture) to the projector.

Japanese Laid-open Patent Publication No. 2012-003521, for example, discloses, for the purpose of allowing the operator of a projector to operate it in a more intuitive manner, a configuration for allowing a projection surface for the projector (a surface on which an image is projected) to be used like a touch panel by capturing an image of the projection surface by a camera to detect the motion of the user.

Japanese Laid-open Patent Publication No. 2008-287142, for example, discloses, for the purpose of preventing the shadow of the operator from being projected on the projection surface, a configuration in which a device for recognizing a gesture is attached in a direction different from a projection direction to recognize the gesture.

However, the technique disclosed in Japanese Laid-open Patent Publication No. 2012-003521 has a problem in that, when the projector is located frontward of the projection surface and when the operator touches the projection surface to operate the projector, the visibility of the video image deteriorates because the shadow of the operator is projected on the projection surface.

With the technique disclosed in Japanese Laid-open Patent Publication No. 2008-287142, the shadow of the operator is not projected on the projection surface. However, this technique has a problem in that, since the operator operates the projector while facing in a direction different from the projection direction, the correspondence between the operator's operation and the projection surface is not easily recognized, so that operability is lowered.

Therefore, there is a need to provide an image projection device with which the visibility of the projected video image can be ensured and which can provide intuitive and easy operation.

SUMMARY OF THE INVENTION

It is an object of the present invention to at least partially solve the problems in the conventional technology.

According to an embodiment, there is provided an image projection device for projecting an image on a projection object. The image projection device includes a detecting unit configured to detect a detection object present within an object space corresponding to the image projected by the image projection device; a recognizing unit configured to recognize an instruction motion of a user based on detection of the detection object by the detecting unit; and an output unit configured to generate an output corresponding to the instruction motion recognized within the object space by the recognizing unit from the instruction motion and the image projected by the image projection device.

According to an embodiment, there is provided an image projection system that includes an image projection device configured to project an image on a projection object; and an information processing device connected to the image projection device. The information processing device includes a detecting unit configured to detect a detection object present within an object space corresponding to the image projected by the image projection device; a recognizing unit configured to recognize an instruction motion of a user based on detection of the detection object by the detecting unit; and an output unit configured to generate an output corresponding to the instruction motion recognized within the object space by the recognizing unit from the instruction motion and the image projected by the image projection device.

According to still another embodiment, there is provided a control method that includes detecting a detection object present within an object space corresponding to an image projected by an image projection device; recognizing an instruction motion of a user based on detection of the detection object at the detecting; and generating an output corresponding to the instruction motion recognized within the object space at the recognizing from the instruction motion and the image projected by the image projection device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the image projection device, image projection system, control method, and program according to the present invention will next be described in detail with reference to the accompanying drawings. In the following description, an ultra-short focus projector is exemplified as the image projection device to which the present invention is applied, but this is not a limitation. For example, a short focus projector or a long focus projector may be used as the image projection device to which the present invention is applied.

The term "focus" as used herein is synonymous with a projection distance representing the distance from a projecting surface to an optical position (for example, the distance from a projection port from which projection light is projected to a projection object on which an image is projected). The projection distance of an ultra-short focus projector is shorter than the projection distance of a short focus projector, and the projection distance of the short focus projector is shorter than the projection distance of a long focus projector. For example, the projection distance of the ultra-short focus projector may be set to "11.7 to 24.9 cm," the projection distance of the short focus projector may be set to "0.7 to 14.6 m," and the projection distance of a long focus projector may be set to "1.3 m to 32.4 m."

Figure 1:
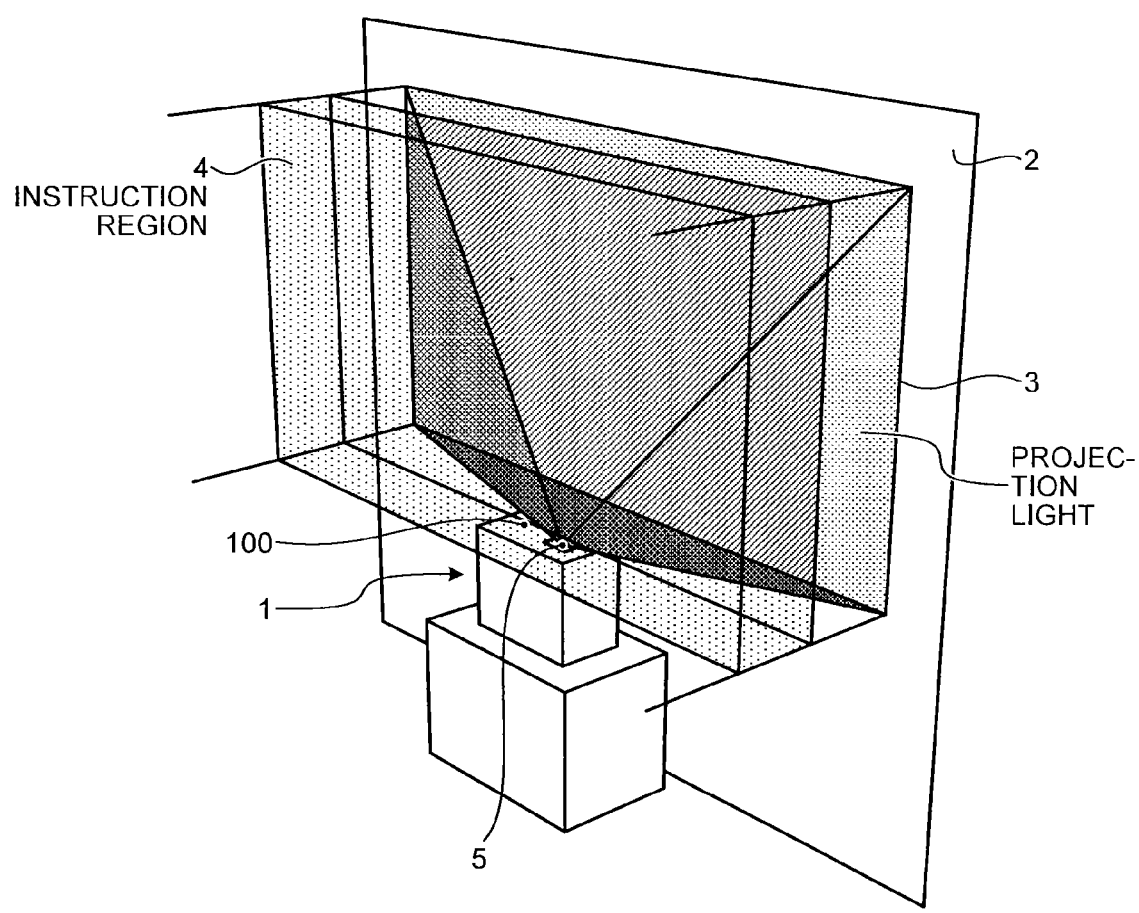
FIG. 1 is a schematic diagram for illustrating a general view.
Figure 2:
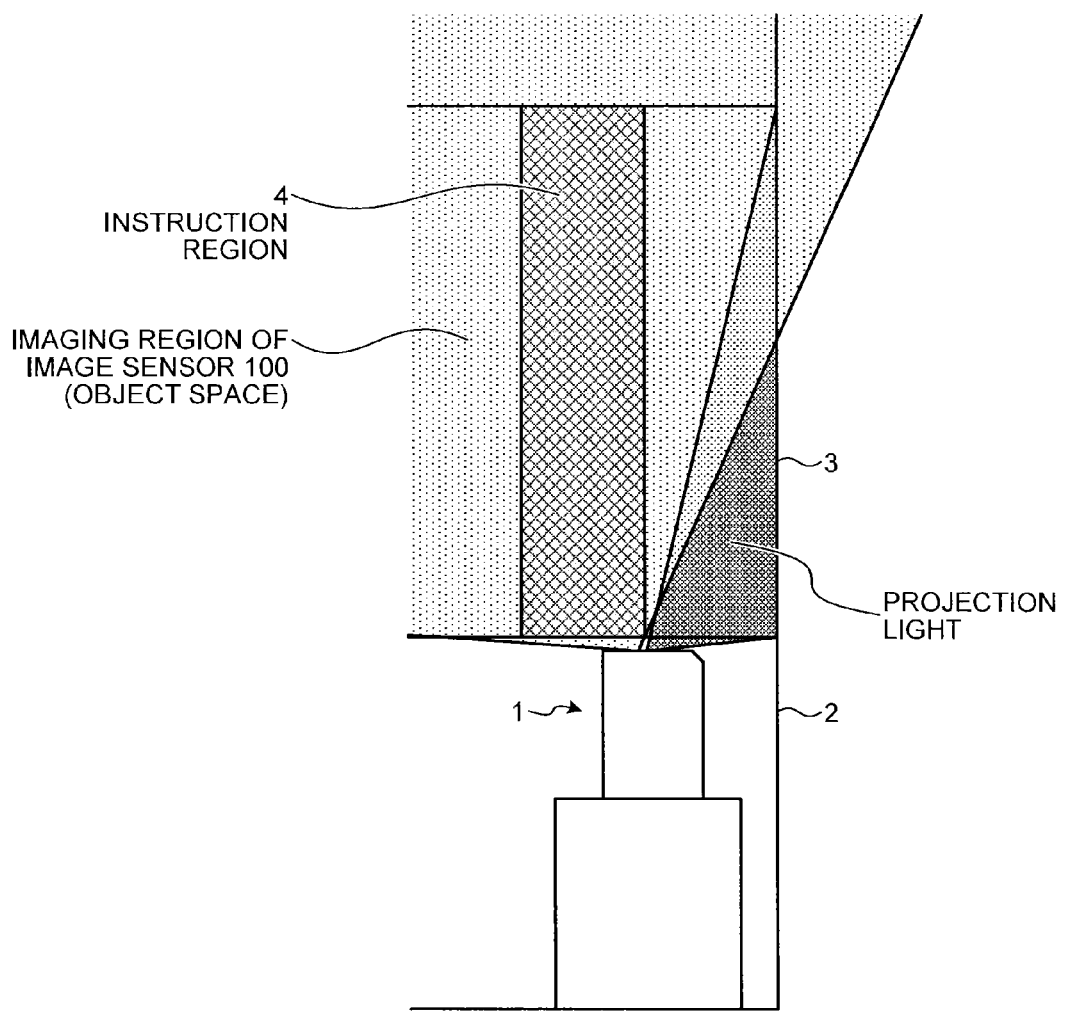
FIG. 2 is a schematic side view of the overall appearance.

FIG. 1 is a schematic diagram for illustrating a general view. FIG. 2 is a schematic side view of the overall appearance. As shown in FIGS. 1 and 2, the projector 1 according to this embodiment is disposed close to a projection object (a wall surface in this example) 2 on which an image is projected. An image sensor 100 and a projection port 5 from which projection light is projected are disposed at different positions in the upper portion of the projector 1. The image sensor 100 is a device for capturing an image of an object space representing a space corresponding to the image projected by the projector 1. In this example, the object space is a space that is located above the projector 1 and includes at least the upper edge of a projection region 3 representing the region of the projection object 2 on which the image is projected. In this embodiment, the image sensor 100 includes a camera, but this is not a limitation. For example, a device such as an infrared camera or a stereo camera may be used as the image sensor 100. In other words, the image sensor 100 may be any device that can capture an image of the object space and can measure the distance of an object within an instruction region 4 in the object space in which the user makes an instruction motion.

In this embodiment, the region in the object space that does not interfere with the projection light projected from the projector 1 and faces the projection region 3 is decided as the instruction region 4 in which an instruction motion corresponding to an action to be executed can be performed, as described later. The size of the surface of the instruction region 4 that faces the projection region 3 may be the same as the size of the projection region 3 or may be different from the size of the projection region 3. For example, the size of the instruction region 4 may be set to be variable according to the displayed contents.

Figure 3:
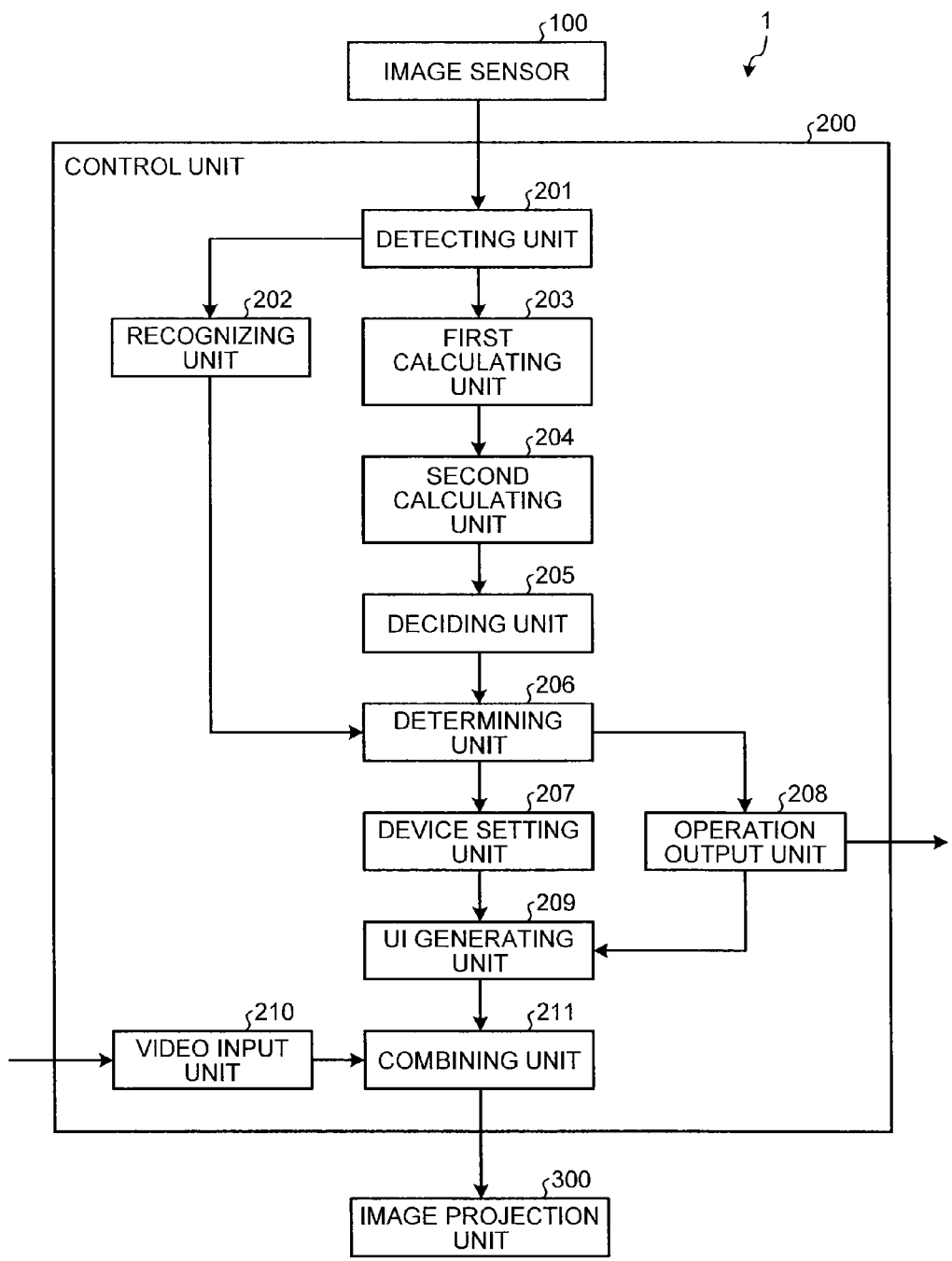
FIG. 3 is a block diagram illustrating an exemplary configuration of a projector according to an embodiment.

FIG. 3 is a block diagram illustrating an exemplary configuration of the projector 1 according to this embodiment. As shown in FIG. 3, the projector 1 includes the image sensor 100, a control unit 200, and an image projection unit 300.

The control unit 200 includes a detecting unit 201, a recognizing unit 202, a first calculating unit 203, a second calculating unit 204, a deciding unit 205, a determining unit 206, a device setting unit 207, an operation output unit 208, a UI generating unit 209, a video input unit 210, and a combining unit 211. Each of the detecting unit 201, the recognizing unit 202, the first calculating unit 203, the second calculating unit 204, the deciding unit 205, the determining unit 206, the device setting unit 207, the operation output unit 208, the UI generating unit 209, the video input unit 210, and the combining unit 211 may be implemented, for example, by executing a program on a processing unit such as a CPU (Central Processing Unit), i.e., by software, by hardware such as an IC (Integrated Circuit), or by a combination of software and hardware.

The detecting unit 201 detects a detection object (for example, the user's hand) present within the object space. In this embodiment, the detecting unit 201 acquires data of the image captured by the image sensor 100 and detects the detection object based on the acquired image data.

The recognizing unit 202 recognizes the instruction motion of the user (for example, a motion such as a hand gesture) based on the detection of the detection object by the detecting unit 201. Any of various known techniques can be used as the method of recognizing the motion such as a hand gesture. The recognizing unit 202 transmits the information about the recognized instruction motion (instruction motion information) to the determining unit 206 described later. The instruction motion information may contain the three-dimensional coordinates etc. of the detection object.

Figure 4:
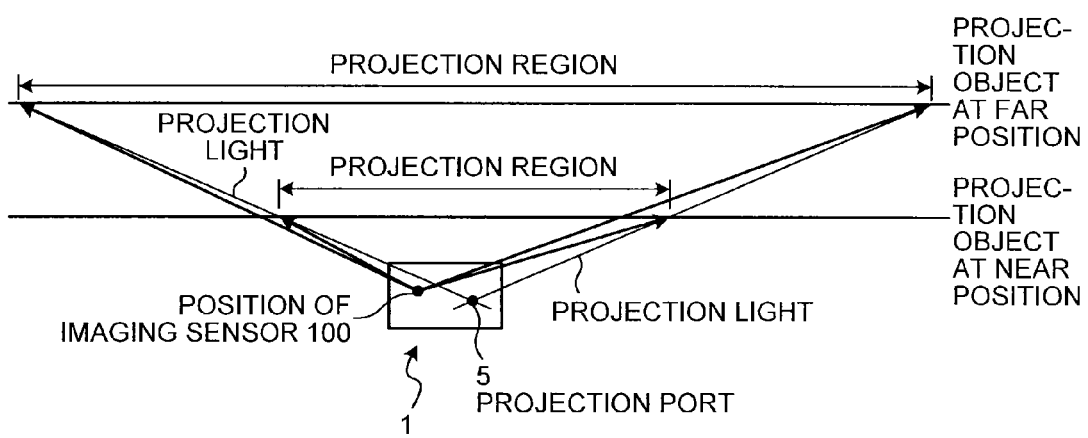
FIG. 4 is an overhead view of the projector.
Figure 5:
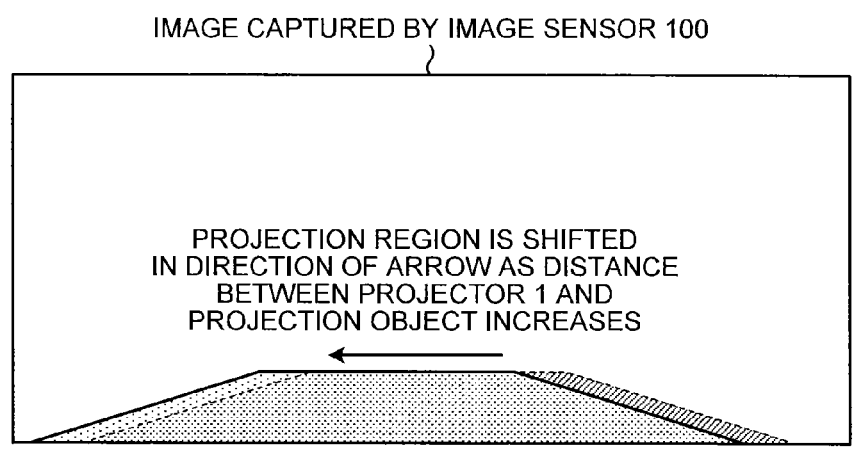
FIG. 5 is a diagram schematically illustrating an image captured by an image sensor.

The first calculating unit 203 calculates the distance between the projector 1 and the projection object 2 using the data of the image captured by the image sensor 100. A method of calculating the distance by the first calculating unit 203 will next be described. FIG. 4 is an overhead schematic view of the projector 1. In the example in FIG. 4, the projection port 5 is disposed on the right side of the projector 1, and the image sensor 100 is disposed on the left side of the projector 1. FIG. 5 is a diagram schematically illustrating the data of the image captured by the image sensor (a camera in this example) 100. In this embodiment, the projection port 5 and the image sensor 100 disposed on the upper portion of the projector 1 are horizontally separated from each other. Therefore, for example, when the projector 1 is spaced further apart from the projection object 2, the projection region in the image data is shifted to the left in the field of view of the camera, as shown in FIG. 5. The distance between the projector 1 and the projection object 2 can be calculated from the amount of movement (the amount of shift). From another point of view, it may be understood that the first calculating unit 203 calculates the distance between the projector 1 and the projection object 2 using the position of the projection region in the data of the image captured by the image sensor 100.

Figure 6:
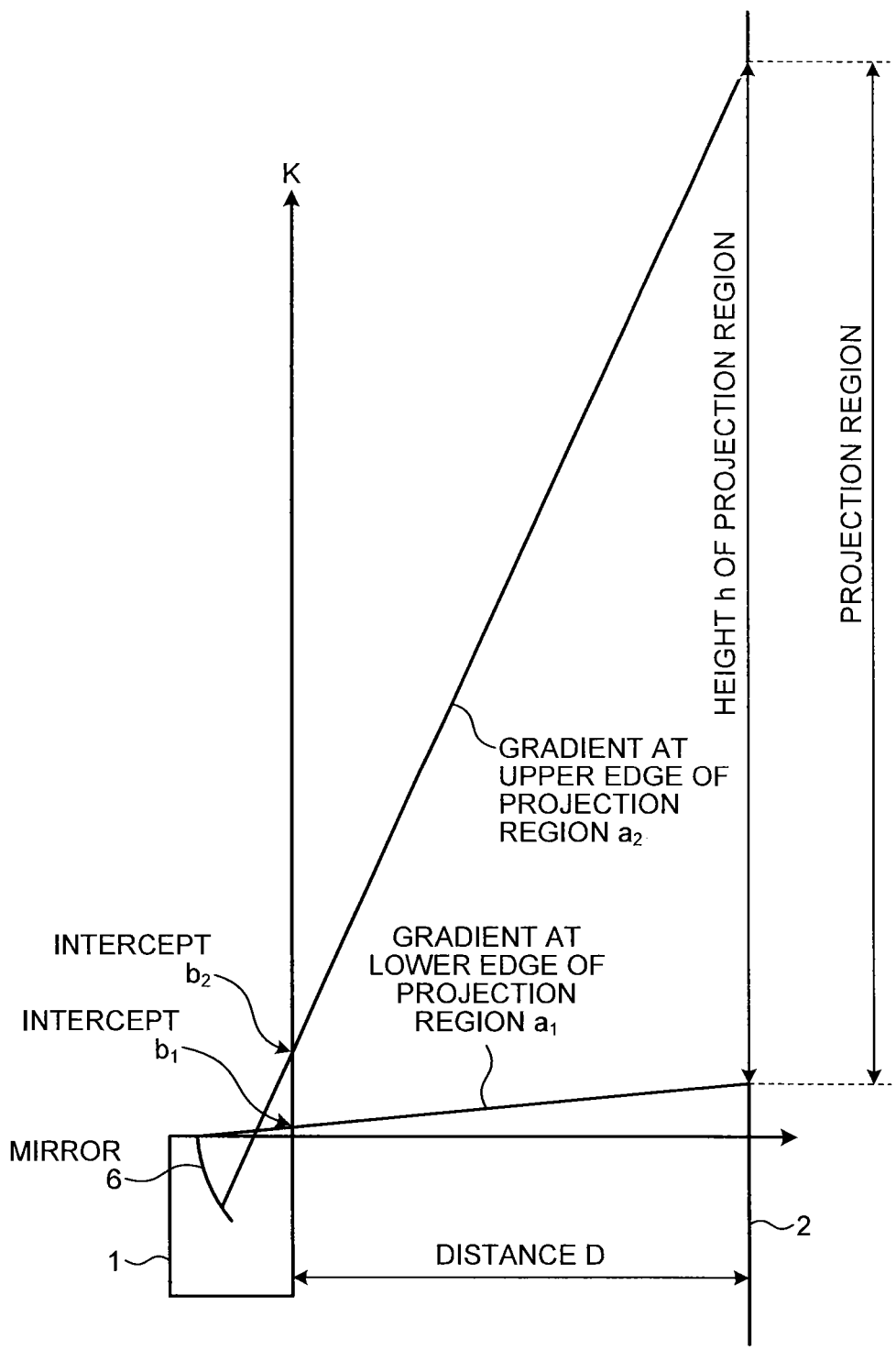
FIG. 6 is a diagram for illustrating a method of calculating the size of a projection region.

Returning to FIG. 3, the description will be continued. The second calculating unit 204 calculates the size of the projection region using the distance calculated by the first calculating unit 203. A method of calculating the size of the projection region by the second calculating unit 204 will next be described. FIG. 6 is a diagram illustrating the method of calculating the size of the projection region. FIG. 6 is a schematic diagram when the projector 1 is viewed from a side. As can be understood from FIG. 6, the height h of the projection region can be represented by an equation 1 below.

$$h = D \times (a2 \times a1) + b2 \times b1 \quad \text{(equation 1)}$$

In the equation 1 above, D represents the distance between the projector 1 and the projection object 2. a2 represents the gradient of projection light incident on the upper edge of the projection region, and a1 represents the gradient of the projection light incident on the lower edge of the projection region. b1 represents an intercept of line K extending upward from the end face of the projector 1 that faces the projection object 2 and parallel to the projection object 2, the intercept corresponding to the intersection of line K and a line representing the projection light projected from the projection port 5 and incident on the lower edge of the projection region. b2 represents an intercept of line K in FIG. 6 that corresponds to the intersection of line K and a line representing the projection light projected from the projection port 5 and incident on the upper edge of the projection region. The values of a1, a2, b1, and b2 are set in advance according to the characteristics etc. of a mirror 6 used in the projector 1.

The width of the projection region can be calculated from the aspect ratio of the screen. As described above, the second calculating unit 204 calculates the height and width of the projection region, and the size (=height×width) of the projection region can thereby be calculated.

Returning again to FIG. 3, the description will be continued. The deciding unit 205 decides the region in the object space that does not interfere with the projection light from the projector 1 and faces the projection region as the instruction region in which an instruction motion corresponding to an action to be executed can be performed. In this embodiment, the deciding unit 205 decides, as the instruction region 4, a cuboidal region that occupies a certain region extending in a direction normal to the projection object 2. As shown in FIGS. 1 and 2, this cuboidal region is located above the projector 1, does not interfere with the projection light, and faces the projection region 3. However, the shape of the instruction region 4 is not limited to such a cuboidal shape and may be freely changed. For example, to allow the user to recognize the approximate location of the instruction region, a mark (any information that can inform the user of the approximate location of the instruction region) may be placed on the upper surface of the projector 1 or on the floor.

The determining unit 206 determines, based on the instruction motion information from the recognizing unit 202, whether or not the instruction motion recognized by the recognizing unit 202 has been performed in the instruction region decided by the deciding unit 205. Information about the decision by the determining unit 206 (the information may include, for example, the instruction motion information) is transmitted to the device setting unit 207 or the operation output unit 208.

The projector 1 in this embodiment has, as its operation modes, a first mode and a second mode. In the first mode, when the determining unit 206 determines that the instruction motion has been performed in the instruction region, a UI image is generated according to the instruction motion and presented to the user, and the device (the projector 1) is set according to the instruction motion (for example, the brightness of the screen is set). In the second mode, when the determining unit 206 determines that the instruction motion has been performed in the instruction region, information about an operation corresponding to the recognized instruction motion is transmitted to an external device (for example, a PC or a server device connected to the projector 1). Then the external device executes processing corresponding to the information received from the projector 1. In this example, one mode is switched to another mode (the first mode->the second mode or the second mode->the first mode) by an administrator authorized to change settings, but this is not a limitation. For example, the projector 1 may have the function of switching the mode according to an input from an unauthorized user.

In the first mode, when the determining unit 206 determines that the instruction motion has been performed in the instruction region, the device setting unit 207 shown in FIG. 3 performs control such that a UI image corresponding to the recognized instruction motion is generated using the decision information (the information from the determining unit 206) and presented to the user. In addition, the device setting unit 207 changes the settings of the actual device according to the operation corresponding to the recognized instruction motion (for example, the action of pressing a UI image of a button).

In the second mode, when the determining unit 206 determines that the instruction motion has been performed in the instruction region, the operation output unit 208 outputs (transmits), to the external device, information about an operation corresponding to the recognized instruction motion based on the decision information. To immediately inform the user that the instruction motion has been appropriately recognized, the operation output unit 208 may perform control such that a UI image is generated according to the recognized instruction motion and presented to the user. In the second mode, when the user makes an instruction motion, for example, moves a hand (a finger) to the right, within the instruction region, the operation output unit 208 outputs information about an operation corresponding to the instruction motion to the external device and may also perform control such that a UI image representing the action of the instruction motion (the UI image may be an image representing the motion or a text image) is generated and presented to the user.

The UI generating unit 209 generates a UI image to be presented to the user according to the instruction motion within the instruction region under the control of the device setting unit 207 or the operation output unit 208. In this example, it may be understood that the UI generating unit 209 corresponds to a "generating unit" in claims. It may also be understood that, for example, a combination of the UI generating unit 209 with the device setting unit 207 or the operation output unit 208 corresponds to the "generating unit" in the claims. The video input unit 210 acquires an input video image from the outside. The combining unit 211 combines (synthesizes) the input video image acquired by the video input unit 210 and the UI image generated by the UI generating unit 209 and supplies the combined (composite) image to the image projection unit 300. The image projection unit 300 projects the image supplied from the combining unit 211 onto the projection object 2.

In this case, it may be understood that the projector 1 includes an output unit that generates an output corresponding to the instruction motion recognized within the object space (more specifically within the instruction region) by the recognizing unit 202 based on the image projected by the projector 1. In this example, it may be understood that the device setting unit 207, the operation output unit 208, the UI generating unit 209, the video input unit 210, the combining unit 211, and the image projection unit 300 correspond to an "output unit" in the claims. However, this is not a limitation. For example, in an embodiment in which the operation output unit 208 is not provided (the second mode is not provided), it may be understood that the device setting unit 207, the UI generating unit 209, the video input unit 210, the combining unit 211, and the image projection unit 300 correspond to the "output unit" in the claims.

Figure 7:
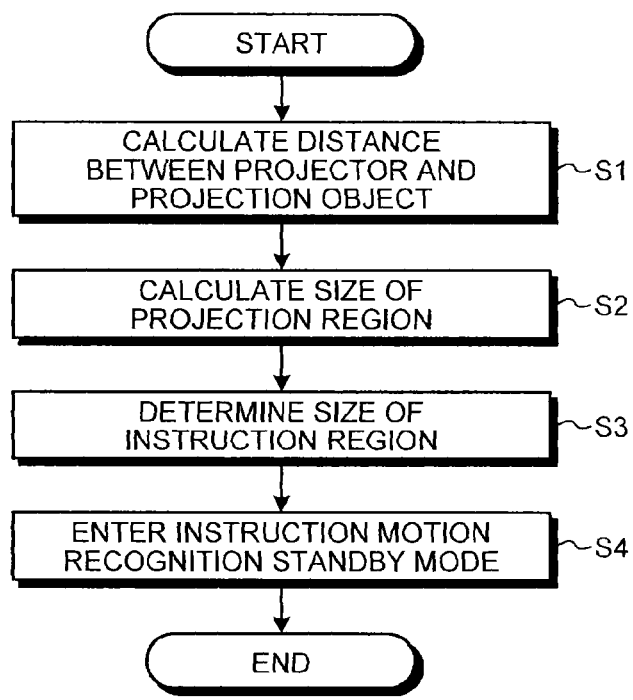
FIG. 7 is a flowchart showing an example of the operation of a projector 1 when the projector 1 boots up until an instruction region is decided.

Next, an example of the operation of the projector 1 from startup until the instruction region is decided will be described. FIG. 7 is a flowchart showing an example of the operation of the projector 1 from startup until the instruction region is decided. As shown in FIG. 7, first, the first calculating unit 203 calculates the distance between the projector 1 and the projection object 2 using the image data acquired by the detecting unit 201 (step S1). Next, the second calculating unit 204 calculates the size of the projection region using the distance calculated in step S1 (step S2). Then the deciding unit 205 decides the size of the instruction region using the size of the projection region calculated in step S2 (step S3) and then decides the instruction region. The recognizing unit 202 is on standby in an instruction motion recognition standby mode until the power is turned off or a gesture function is turned off (step S4). As described above, since the size of the projection region varies depending on the distance between the projector 1 and the projection object 2, the size of the instruction region also varies depending on the distance between the projector 1 and the projection object 2. For example, in a configuration in which a sensor for detecting the movement of the projector 1 is mounted on the projector 1, when the sensor detects the movement of the projector 1, the processing in steps S1 to S3 described above may be repeated.

Figure 8:
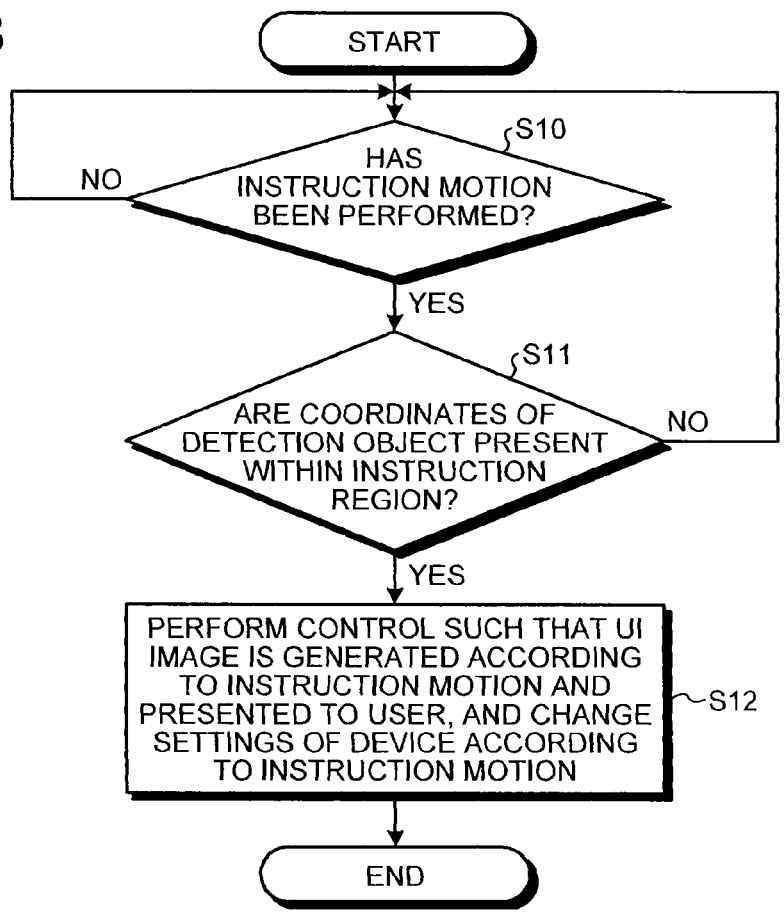
FIG. 8 is a flowchart showing an example of the operation of an image projection device in a first mode.

Next, an example of the operation of the projector 1 after it enters the instruction motion recognition standby mode will be described separately for the first mode and the second mode. FIG. 8 is a flowchart showing an example of the operation in the first mode. As shown in FIG. 8, first, if the recognizing unit 202 recognizes an instruction motion of the user (step S10: YES), the determining unit 206 determines, based on the instruction motion information from the recognizing unit 202, whether or not the coordinates of the detection object (for example, the user's hand) is present within the instruction region decided by the deciding unit 205 (step S11). From another point of view, it may be understood that the determining unit 206 determines whether or not the instruction motion recognized by the recognizing unit 202 has been performed within the instruction region. In this embodiment, in the instruction motion recognition standby mode, when the image data captured by the camera includes the data of the detection object and the detection object is detected by the detecting unit 201, the recognizing unit 202 recognizes the instruction motion of the user, and instruction motion information indicating the recognized instruction motion is transmitted to the determining unit 206. As described above, the instruction motion information may contain the three-dimensional coordinates of the detection object and other information.

Figure 9:
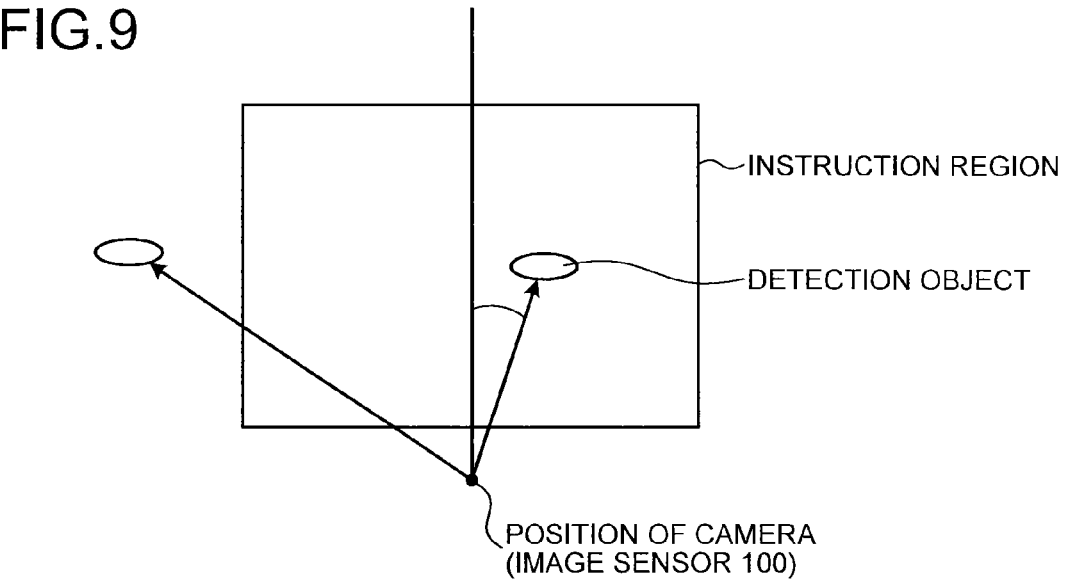
FIG. 9 is a diagram for illustrating a method of determining whether or not a detection object is present within the instruction region.

FIG. 9 is a diagram for illustrating a method of determining whether or not the detection object is present within the instruction region. Using the camera (the image sensor 100), the position (angle) of the detection object vertically above the camera and the distance to the detection object can be measured. When these two are known, whether or not the detection object is present within the instruction region can be determined using the position of the projection region calculated by the second calculating unit 204 and the depth of the instruction region (its dimension in the direction normal to the projection object 2) decided by the deciding unit 205. In this example, the instruction motion information from the recognizing unit 202 contains information indicating the position (angle) of the detection object vertically above the camera and the distance to the detection object. The determining unit 206 receives the information indicating the position of the projection region from the second calculating unit 204 and the information indicating the depth of the instruction region from the deciding unit 205. Then the determining unit 206 determines, based on the above information, whether or not the detection object is present within the instruction region.

Returning to FIG. 8, the description will be continued. If a decision is made in step S11 described above that the coordinates of the detection object are present within the instruction region (step S11: YES), the device setting unit 207 performs control such that a UI image is generated according to the recognized instruction motion and presented to the user and then changes the settings of the device according to the operation corresponding to the recognized instruction motion (step S12).

Figure 10:
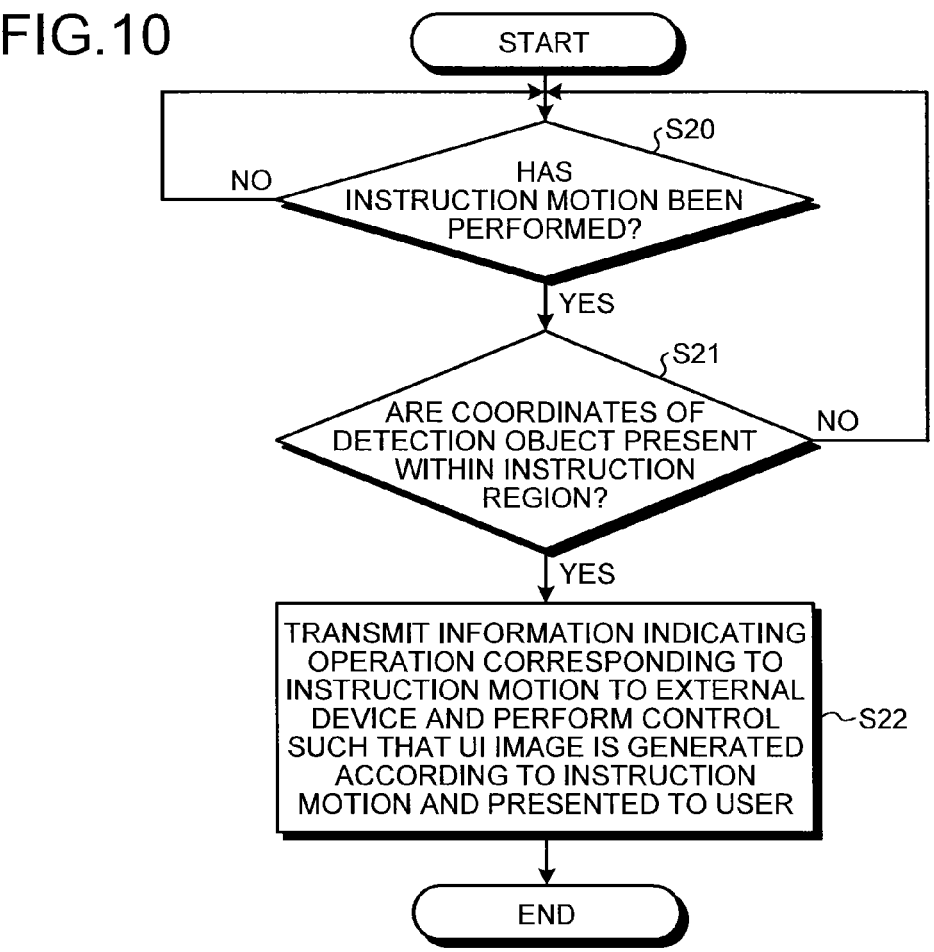
FIG. 10 is a flowchart showing an example of the operation of the image projection device in a second mode.

FIG. 10 is a flowchart showing an example of the operation in the second mode. The details of the processing in steps S20 and S21 in FIG. 10 are the same as those in steps S10 and S11 in FIG. 8, and the detailed description thereof will be omitted. In step S22, the operation output unit 208 outputs information indicating the operation corresponding to the recognized instruction motion to the external device and performs control such that a UI image is generated according to the recognized instruction motion and presented to the user.

Next, an example of the generation of the UI image in this embodiment will be described. In the following description, the first mode will be described as an example. The UI generating unit 209 generates the UI image according to the positional relation between the detection object and the projection region under the control of the device setting unit 207.

Figure 11:
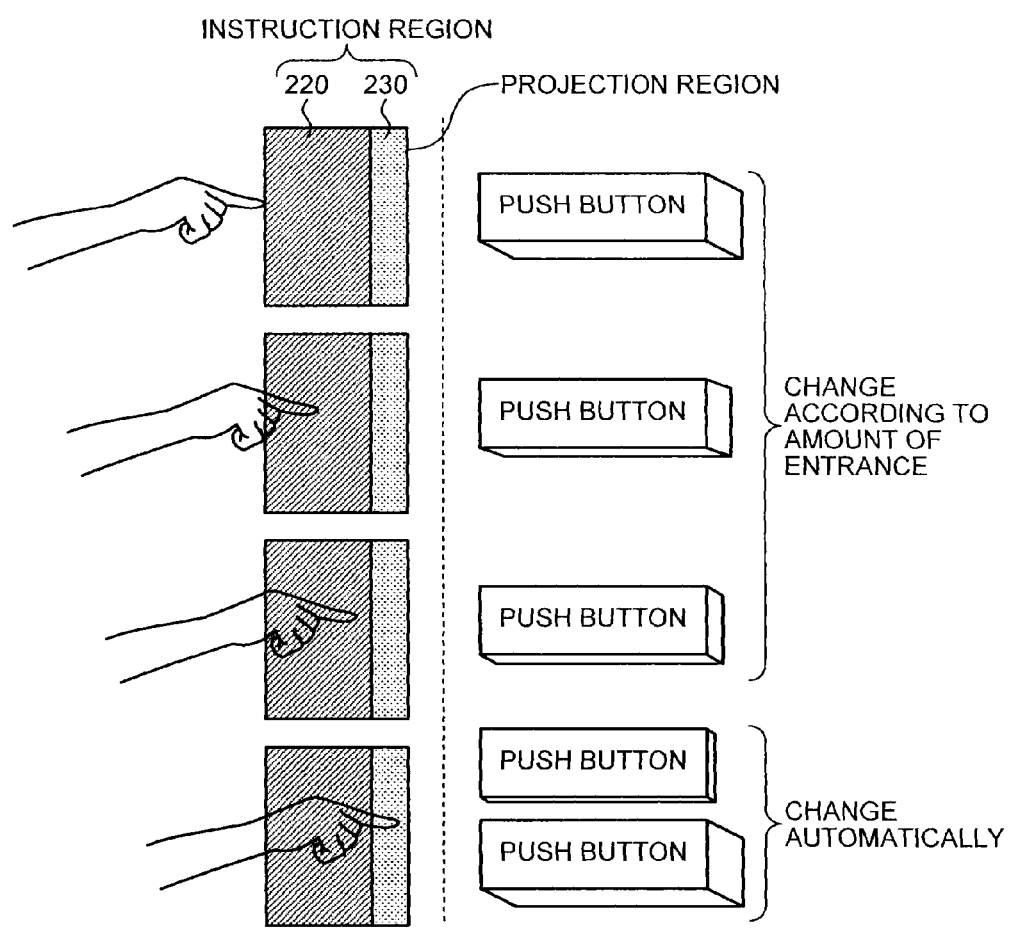
FIG. 11 is a diagram for illustrating an example of the generation of a UI image.

More specifically, when an image of a button is displayed in a position within the projection region that corresponds to the detection object as shown in FIG. 11, the UI generating unit 209 generates the UI image such that it shows that the button is gradually pressed as the detection object approaches the projection region. When the distance between the detection object and the projection region becomes equal to or less than a threshold value, the UI generating unit 209 generates the UI image such that it shows completion of the operation. In the following description, a region within the instruction region in which the distance to the projection region (the distance in the direction normal to the projection object 2) is larger than the threshold value is denoted as a first region 220, and a region in which the distance is equal to or less than the threshold value is denoted as a second region 230. In the example in FIG. 11, when the user's hand, i.e., the detection object, is present within the first region 220, the UI image is generated such that it shows that the push button is gradually pressed as the user's hand approaches the projection region and is presented (fed back) to the user. More specifically, the UI image of the button changes according to the amount of the user's hand entering the first region 220. When the user's hand reaches the second region 230, the UI image is generated such that it shows that the button temporarily retracts and then returns to the original position and is presented to the user, in order to inform the user of completion of the operation.

Figure 12:
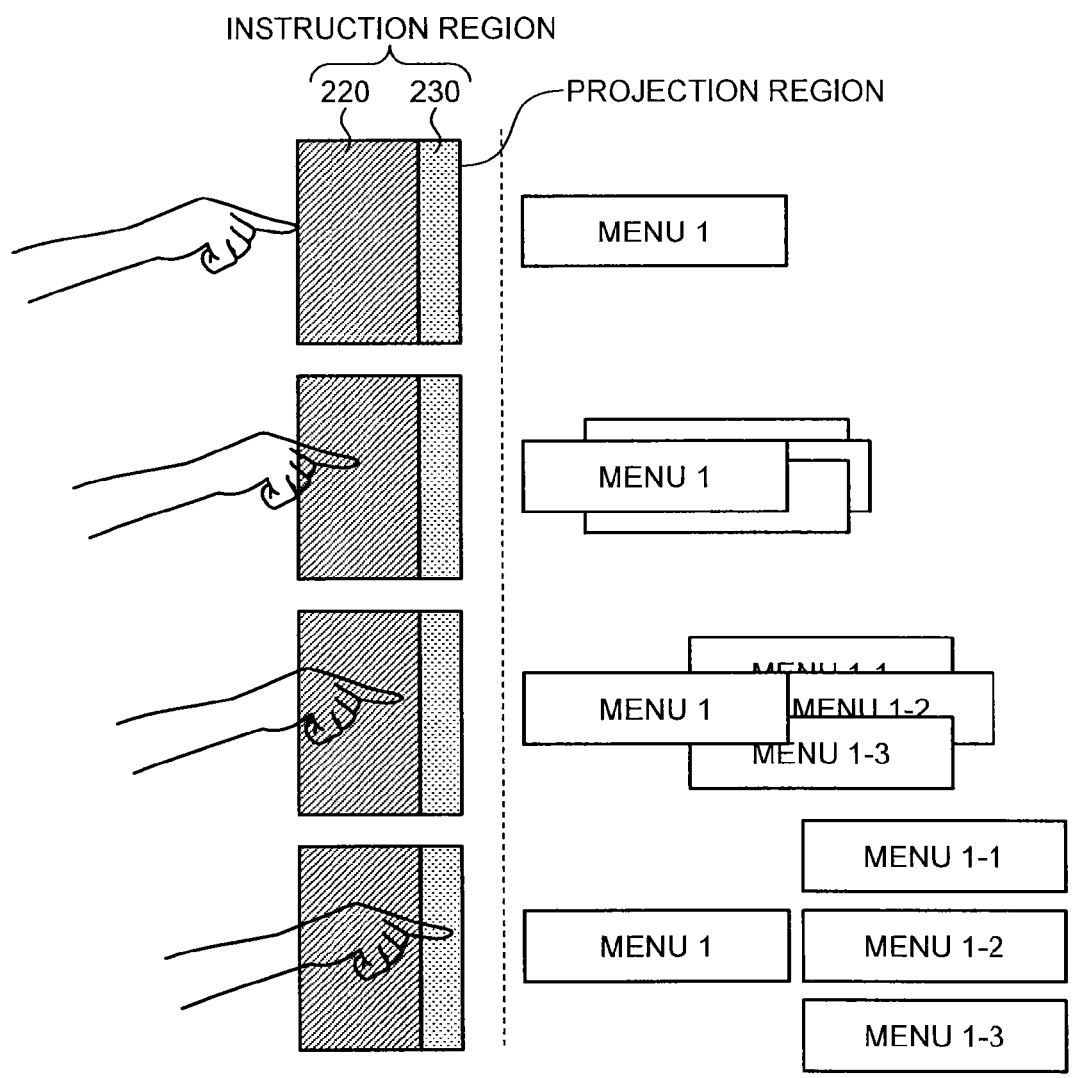
FIG. 12 is a diagram for illustrating an example of the generation of a UI image.

When an image of overlapping menus with a layered structure is displayed in a position within the projection region that corresponds to the detection object as shown in FIG. 12, the UI generating unit 209 generates a UI image such that it shows that menus in a lower layer are gradually expanded as the detection object approaches the projection region. When the distance between the detection object and the projection region becomes equal to or less than the threshold value, the UI generating unit 209 generates the UI image such that it shows that the menus with the layered structure are arranged in a single plane and the operation is completed. In the example in FIG. 12, when the user's hand, i.e., the detection object, is present within the first region 220, the UI image is generated such that it shows that the menus in the lower layer (menus 1-1 to 1-3 in the example in FIG. 12) are expanded as the user's hand approaches the projection region and is presented to the user. When the user's hand reaches the second region 230, the UI image is generated such that it shows that all the menus are fully expanded (arranged in a single plane) and is presented to the user. As in the example in FIG. 11, when the user's hand enters the second region 230, a UI image for informing the user of completion of the operation may be generated and presented to the user.

Figure 13:
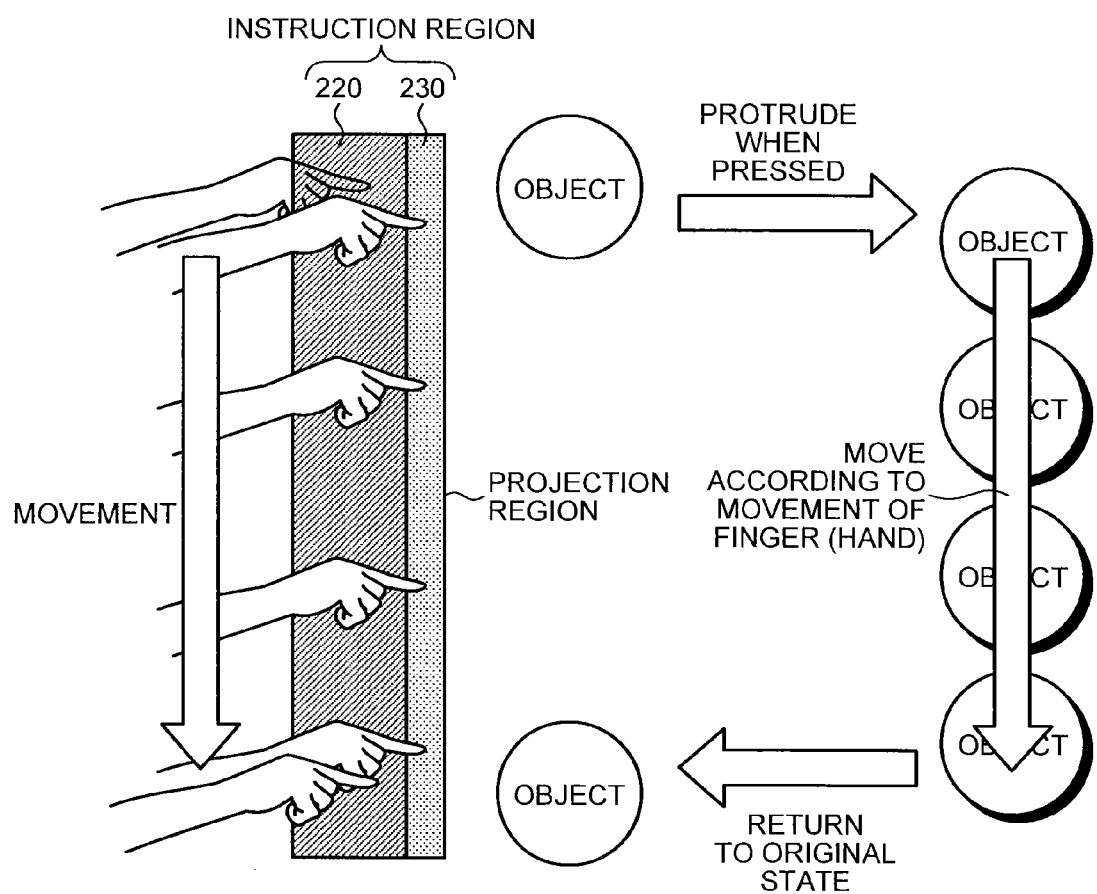
FIG. 13 is a diagram for illustrating an example of the generation of a UI image.

When a draggable object is displayed in a position within the projection region that corresponds to the detection object as shown in FIG. 13, the UI generating unit 209 generates a UI image such that it shows that the object gradually protrudes toward the user as the detection object approaches the projection region. When the distance between the detection object and the projection region becomes equal to or less than the threshold value, the UI generating unit 209 generates the UI image such that it shows that the object moves so as to follow the movement of the detection object moving in the region within the instruction region in which the distance to the projection region is equal to or less than the threshold value. Then, when the distance between the detection object and the projection region becomes larger than the threshold value, the UI generating unit 209 generates the UI image such that it shows that the object stops following the movement of the detection object. In the example in FIG. 13, when the user's hand, i.e., the detection object, is present within the first region 220, the UI image is generated such that it shows that the object displayed in the position in the projection region that corresponds to the user's hand gradually protrudes toward the user as the user's hand approaches the projection region and is presented to the user. When the user's hand reaches the second region 230, the object can be dragged, and the UI image is generated such that it shows that the object moves so as to follow the movement of the user's hand in the second region 230 and is presented to the user. When the user's hand returns to the first region 220, the UI image is generated such that it shows that the object stops following the movement of the user's hand and is presented to the user.

Figure 14:
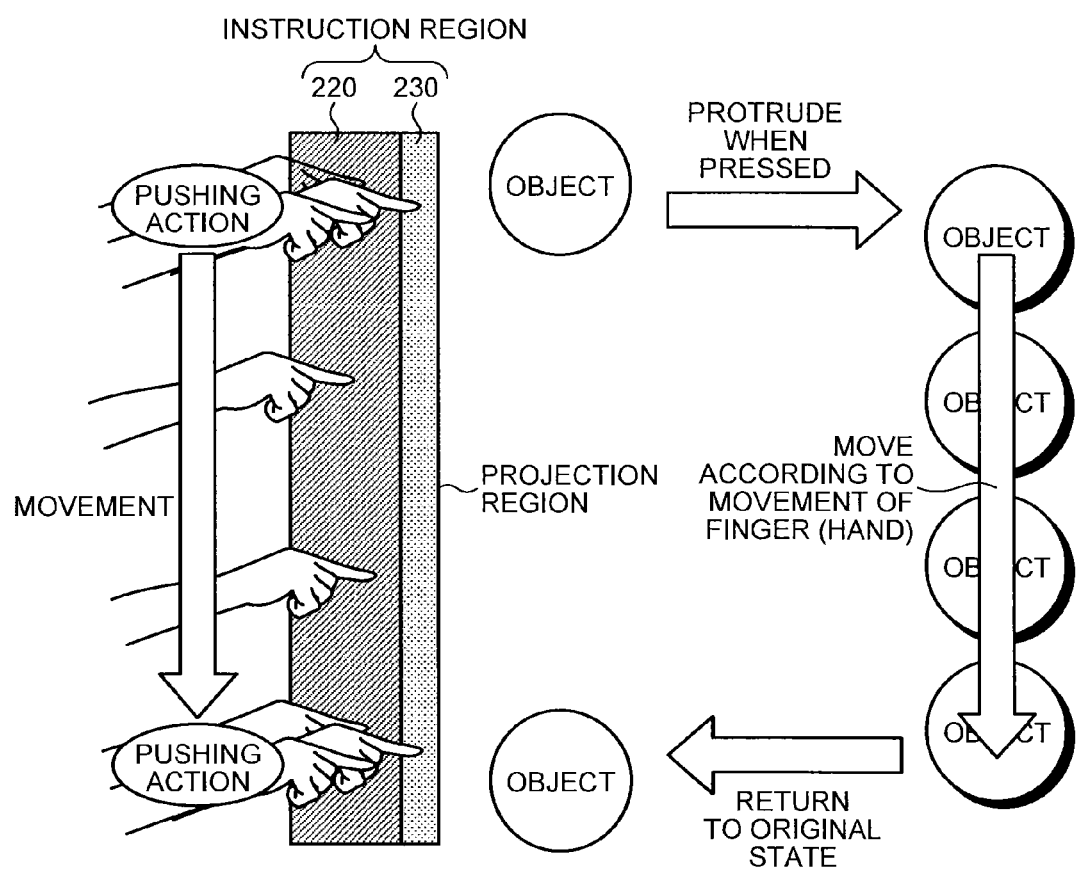
FIG. 14 is a diagram for illustrating another example of the generation of a UI image representing a drag operation.

For example, the UI generating unit 209 may generate a UI image in a manner shown in FIG. 14. Specifically, when an object is displayed in a position in the projection region that corresponds to the detection object and the distance between the detection object and the projection region is equal to or less than the threshold value, the UI image is generated such that it shows that the object protrudes toward the user. Then the UI image is generated such that it shows that the object moves so as to follow the movement of the detection object moving in the region within the instruction region in which the distance to the projection region is larger than the threshold value. When the distance between the detection object and the projection region again becomes equal to or less than the threshold value, the UI image is generated such that it shows that the object stops following the movement of the detection object and returns to the non-protruding state. In the example in FIG. 14, when the object is displayed in the position within the projection region that corresponds to the user's hand and the user's hand is present within the second region 230 (this may be understood that the action of pressing the object is performed), the UI image is generated such that it shows that the object protrudes toward the user and is presented to the user. Then, when the user's hand returns to the first region 220, the UI image is generated such that it shows that the object allowed to be dragged moves so as to follow the movement of the user's hand moving in the first region 220 and is presented to the user. Then, when the user's hand again reaches the second region 230 (when the action of pressing the object is again performed), the UI image is generated such that it shows that the object stops following the movement of the user's hand and returns to the non-protruding state and is presented to the user.

Figure 15:
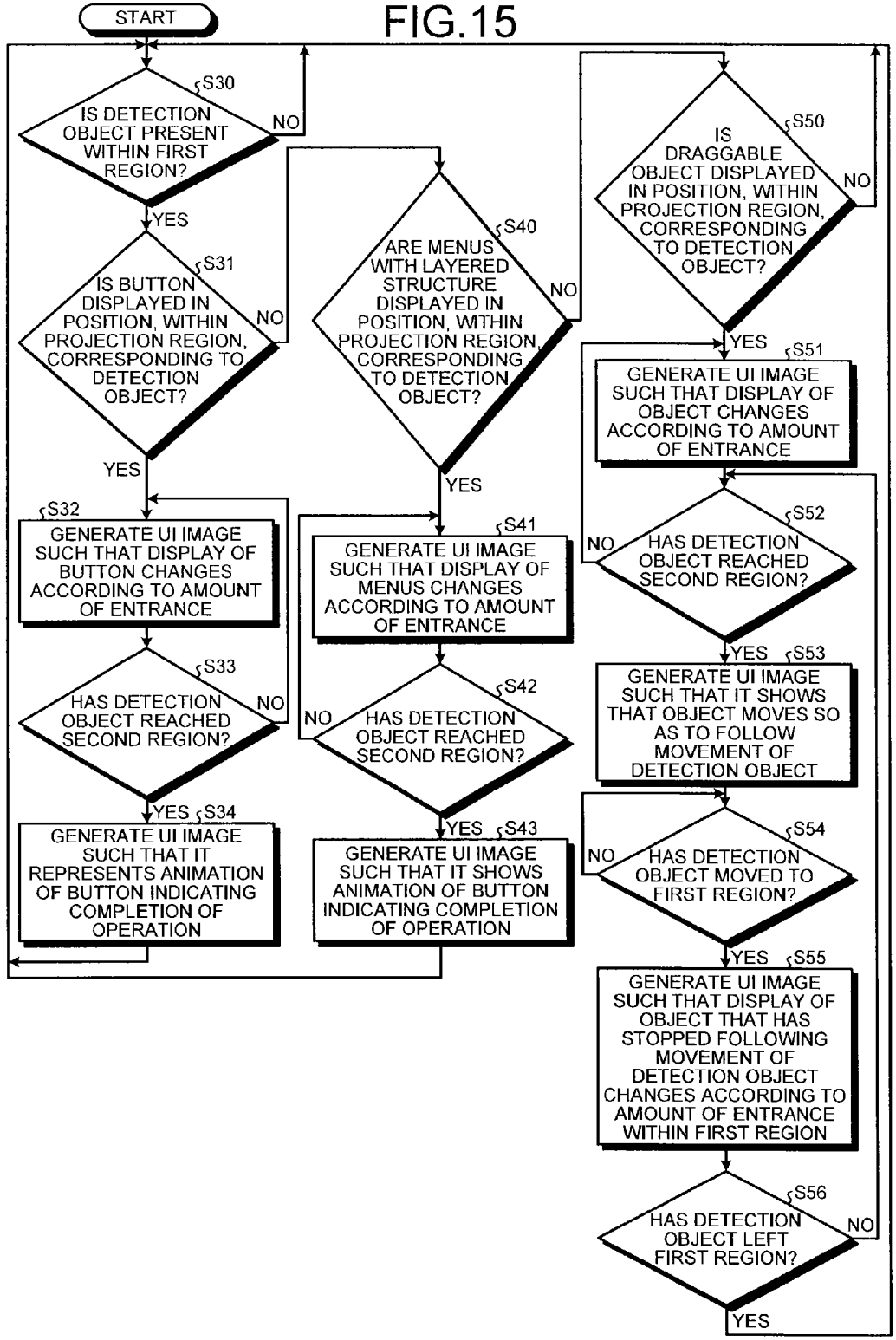
FIG. 15 is a flowchart showing an example of the operation of the projector according to the embodiment when the projector generates a UI image according to an instruction operation by a user and presents the generated image to the user.

FIG. 15 is a flowchart showing an example of the operation when the projector 1 according to this embodiment generates the UI image according to the instruction motion of the user and presents the generated UI image to the user (the operation flow in FIGS. 11 to 13). As shown in FIG. 15, first, the projector 1 determines whether or not the detection object is present within the first region 220 (step S30). If a determination is made that the detection object is present within the first region 220 (step S30: YES), the projector 1 determines whether or not an image of a button is displayed in a position within the projection region that corresponds to the detection object (the user's hand in this example) (step S31).

In step S31 above, if a determination is made that the image of the button is displayed in the position within the projection region that corresponds to the detection object (step S31: YES), the projector 1 generates a UI image such that the display of the button changes according to the amount of the detection object entering the first region 220 (step S32) and projects and displays an image obtained by combining the generated UI image and the input video image on the projection object. Next, the projector 1 determines whether or not the detection object has reached the second region 230 (step S33). If a determination is made that the detection object has reached the second region 230 (step S33: YES), a UI image representing animation of a button indicating completion of the operation is generated (step S34), and an image obtained by combining the generated UI image and the input video image is projected and displayed on the projection object. Then processing in step S30 and subsequent steps is repeated.

If a determination is made in step S31 above that no button image is displayed in the position within the projection region that corresponds to the detection object (step S31: NO), a determination is made as to whether or not menus with a layered structure are displayed in the position within the projection region that corresponds to the detection object (step S40).

If a determination is made in step S40 above that menus with a layered structure are displayed in the position within the projection region that corresponds to the detection object (step S40: YES), a UI image is generated such that the display of the menus changes according to the amount of the detection object entering the first region 220 (step S41), and an image obtained by combining the generated UI image and the input video image is projected and displayed on the projection object. Next, the projector 1 determines whether or not the detection object has reached the second region 230 (step S42). If a determination is made that the detection object has reached the second region 230 (step S42: YES), a UI image representing animation of a button indicating completion of the operation is generated (step S43), and an image obtained by combining the generated UI image and the input video image is projected and displayed on the projection object. Then processing in step S30 and subsequent steps is repeated.

If a determination is made in step S40 above that no menus with a layered structure are displayed in the position within the projection region that corresponds to the detection object (step S40: NO), a determination is made as to whether or not a draggable object is displayed in the position within the projection region that corresponds to the detection object (step S50). If a determination is made that a draggable object is displayed in the position within the projection region that corresponds to the detection object (step S50: YES), a UI image is generated such that the display of the object changes according to the amount of the detection object entering the first region 220 (step S51), and an image obtained by combining the generated UI image and the input video image is projected and displayed on the projection object.

Next, the projector 1 determines whether or not the detection object has reached the second region 230 (step S52). If a determination is made that the detection object has reached the second region 230 (step S52: YES), a UI image is generated such that it shows that the object moves so as to follow the movement of the detection object moving in the second region 230 (step S53). Next, the projector 1 determines whether or not the detection object has moved again to the first region 220 (step S54). If a determination is made that the detection object has moved again to the first region 220 (step S54: YES), a UI image is generated such that the display of the object that has stopped following the movement of the detection object changes according to the amount of the detection object entering the first region 220 (step S55), and an image obtained by combining the generated UI image and the input video image is projected and displayed on the projection object.

Next, the projector 1 determines whether or not the detection object has left the first region 220 (step S56). If a determination is made that the detection object has not left the first region 220 (step S56: NO), processing in step S52 and subsequent steps is repeated. If a determination is made that the detection object has left the first region 220 (step S56: YES), processing in step S30 and subsequent steps is repeated.

Figure 16:
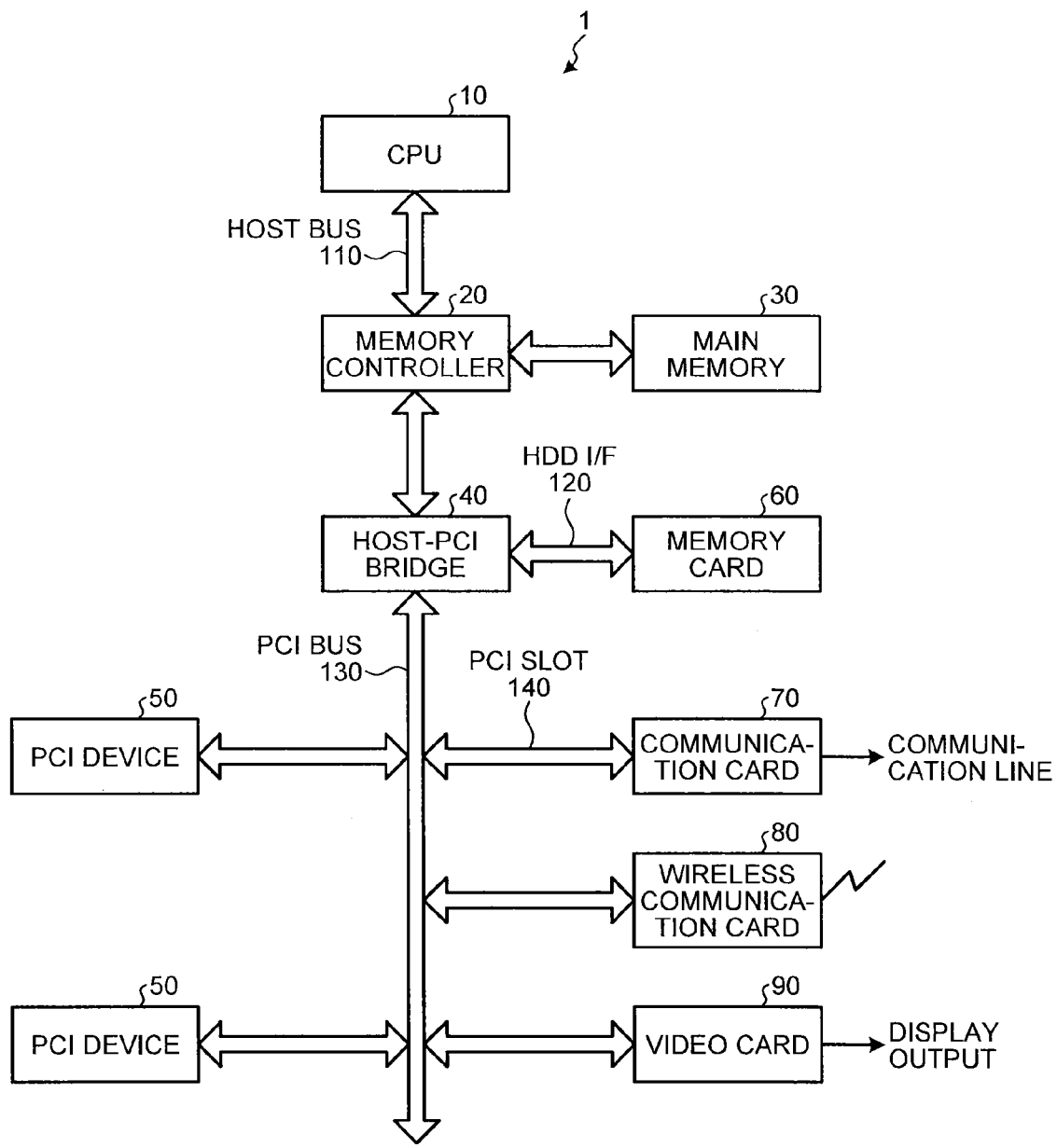
FIG. 16 is a diagram illustrating an exemplary hardware configuration of the projector according to the embodiment.

Next, the hardware configuration of the projector 1 according to this embodiment will be described. FIG. 16 is a block diagram illustrating an exemplary hardware configuration of the projector 1. As shown in FIG. 16, the projector 1 includes a CPU 10, a memory controller 20, a main memory 30, and a host-PCI bridge 40. The memory controller 20 is connected to the CPU 10, the main memory 30, and the host-PCI bridge 40 through a host bus 110.

The CPU 10 controls the entire projector 1. The memory controller 20 controls read, write, and other operations of the main memory 30. The main memory 30 is a system memory used as a memory for storing programs and data, a memory in which programs and data are expanded, and a graphic memory.

The host-PCI bridge 40 is a bridge for connecting peripheral devices and PCI (Peripheral Component Interconnect) devices 50. The host-PCI bridge 40 is connected to a memory card 60 through an HDD I/F 120. The host-PCI bridge 40 is also connected to the PCI devices 50 through a PCI bus 130. The host-PCI bridge 40 is also connected to a communication card 70, a wireless communication card 80, a video card 90, etc. through the PCI bus 130 and PCI slots 140.

The memory card 60 is used as a boot device for an OS. The communication card 70 and the wireless communication card 80 are used for connection with a network such as a LAN and communication lines. The video card 90 is used for projection of an image and outputs a video signal to a display. Control programs executed on the projector 1 in this embodiment are provided as programs pre-installed in, for example, a storage memory in the main memory 30.

In this embodiment, the object space is located above projector 1, and the region within the object space that does not interfere with the projection light from the projector 1 and faces the projection region is determined as the instruction region in which an instruction motion corresponding to the action to be executed can be performed, as described above.

Therefore, the shadow of the operator is not projected on the projected image, and the operator makes an instruction motion within the region facing the image projected on the projection object, so that the operator can intuitively understand the correspondence between the operator's operation and the projected image. Therefore, this embodiment has a specific effect in that an intuitive and easy operation can be provided while the visibility of the projected image is ensured.

Next, a comparative example of this embodiment will be described. The comparative example is assumed to have a configuration (for example, the configuration in Japanese Laid-open Patent Publication No. 2012-003521) in which the image of the projection region is captured using an image sensor such as a camera to detect the motion of the user so that the projection region is used like a touch panel. For example, a camera with a horizontal angle of view=60° and a vertical angle of view=50° is used as the image sensor for capturing the image of the projection region, and the horizontal distance from a virtual operation plane to the camera is set to be 85 cm. Then the horizontal width×vertical width of the virtual operation plane is 100 cm×100 cm. Since this size includes the size of a projection screen (100 cm×60 cm for a 48 inch screen), a low-cost camera can be used. However, in the case of, for example, an ultra-short focus projector, the projection distance is "11.7 to 24.9 cm" as described above. Therefore, the distance between the camera installed in the ultra-short focus projector and the virtual operation plane (which can be assumed to be the projection region in the comparative example) is significantly shorter than that in the above case, so that the size of the virtual operation plane of which image is captured by the camera becomes larger than the size of the projection screen. Accordingly, when the technique of the comparative example is applied to a projector, such as an ultra-short focus projector, having a projection distance shorter than a prescribed reference value (for example, 85 cm), a camera with a larger angle of view (a larger viewing angle) must be used, and this causes a problem of an increase in cost.

However, in the above embodiment, the only function required to be provided in the image sensor 100 installed in the projector 1 is the function of capturing an image of the instruction region that is within the object space above the projector 1 and is a region not interfering with the projection light from the projector 1 and facing the projection region (in other words, it is not necessary to capture an image of the entire projection region as in the comparative example). This is advantageous in that, even when an ultra-short focus projector is used, a low-cost camera can be used as the image sensor 100 installed in the projector, and the specific effect described above can also be achieved. Therefore, the present invention is particularly effective when the invention is applied to a projector, such as an ultra-short focus projector, having a projection distance shorter than the prescribed reference value. However, this is not a limitation, and the present invention can be applied to a projector having a projection distance equal to or larger than the prescribed reference value. It is appreciated that, even in this case, the above-described specific effect can be achieved.

For example, in the embodiment described above, the configuration in which the projector 1 includes the image sensor 100 (the configuration in which the projector 1 is integrated with the image sensor 100) has been described as an example. However, this is not a limitation. For example, the image sensor 100 may be provided separately (independently) from the projector 1.

Figure 17:
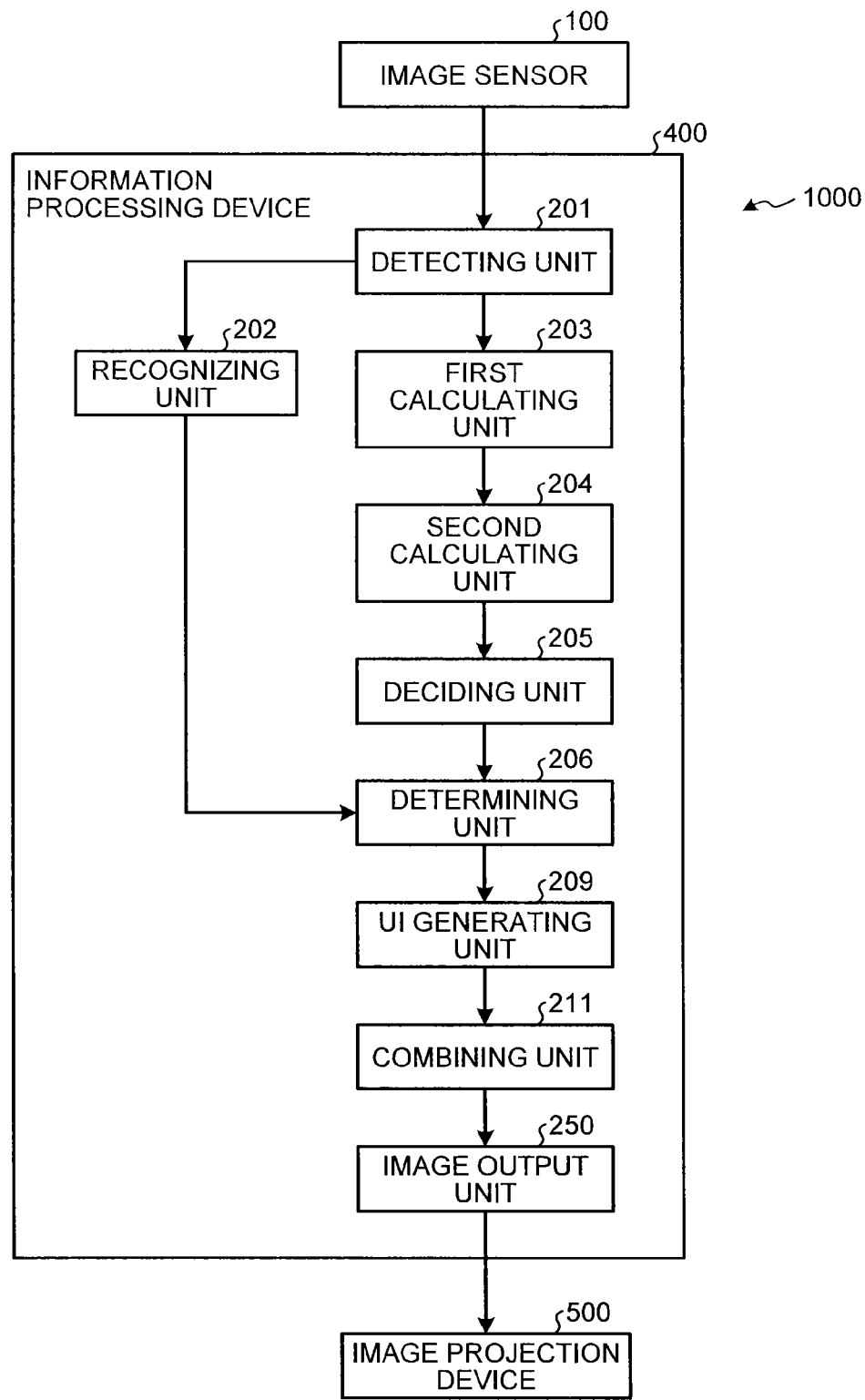
FIG. 17 is a diagram illustrating an exemplary configuration of an image projection system according to a modification.

For example, the present invention can be applied to an image projection system including: an image projection device for projecting an image onto a projection object; and an information processing device connected to the image projection device. FIG. 17 is a diagram illustrating an exemplary configuration of the image projection system 1000 to which the present invention is applied. As shown in FIG. 17, the image projection system 1000 includes an image sensor 100, an information processing device 400, and an image projection device 500. The information processing device 400 includes the above described detecting unit 201, recognizing unit 202, first calculating unit 203, second calculating unit 204, deciding unit 205, determining unit 206, UI generating unit 209, and combining unit 211 and further includes an image output unit 250. The functions of the components included in the information processing device 400 (the detecting unit 201, the recognizing unit 202, the first calculating unit 203, the second calculating unit 204, the deciding unit 205, the determining unit 206, the UI generating unit 209, the combining unit 211, and the image output unit 250) may be implemented, for example, by executing a program on a processing unit such as a CPU (Central Processing Unit), i.e., by software, by hardware such as an IC (Integrated Circuit), or by a combination of software and hardware.

In the example in FIG. 17, the device setting unit 207 and the operation output unit 208 are not provided, and the UI generating unit 209 generates a UI image according to the instruction motion of the user using information from the determining unit 206. The combining unit 211 combines the UI image generated by the UI generating unit 209 and a video image stored in the information processing device 400 (image data stored in, for example, an unillustrated memory). The image output unit 250 outputs the image combined by the combining unit 211 to the image projection device 500. The image projection device 500 projects and displays the image supplied from the information processing device 400 onto a projection object. In this example, it may be understood that the UI generating unit 209, the combining unit 211, and the image output unit 250 in the information processing device 400 correspond to an "output unit" in claim 10.

Programs executed on the projector 1 or the information processing device 400 may be provided as files recorded on a computer readable recording medium such as a CD-ROM, a flexible disk (FD), a CD-R, or a DVD (Digital Versatile Disk) in an installable format or an executable format.

The programs executed on the projector 1 or the information processing device 400 may be stored in a computer connected to a network such as the internet and provided by downloading them through the network. The programs executed on the projector 1 or the information processing device 400 may be provided or distributed through a network such as the internet.

According to the embodiment, it is possible to provide advantageous effects in that the visibility of the projected video image is ensured and intuitive and easy operation can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection device for projecting an image on a projection object, the image projection device comprising:
   a projection port from which projection light to project the image is emitted;
   an image sensor configured to capture an image of an object space corresponding to the projected image, the object space including an upper edge of a projection region that indicates a region on which the image is projected on a projection object, the image sensor being disposed in a position different from the projection port; and
   circuitry configured to
      calculate a distance between the image projection device and the projection object using an amount of movement of the projection region in the image captured by the image sensor, the amount of movement changing depending on the distance between the image projection device and the projection object
      calculate a size of the projection region using the calculated distance;
      decide, as an instruction region in which an instruction motion of a user is performed, a region within the object space, using the calculated size of the projection region;
      detect a detection object present within the decided instruction region
      recognize the instruction motion of the user based on detection of the detection object; and
      generate an output corresponding to the instruction motion recognized within the object space from the instruction motion and the image projected by the image projection device.

2. The image projection device according to claim 1, wherein the circuitry is further configured to
   generate a UI image to be presented to the user according to the instruction motion performed within the instruction region;
   combine an input video image and the generated UI image to generate a composite image; and
   project the generated composite image on the projection object.

3. The image projection device according to claim 2, wherein the circuitry is configured to generate the UI image according to a positional relation between the detection object and the projection region.

4. The image projection device according to claim 3, wherein
   the circuitry is configured to generate the UI image such that the UI image shows that a button is gradually pressed as the detection object approaches the projection region when an image of the button is displayed in a position corresponding to the detection object within the projection region, and
   the circuitry is configured to generate the UI image such that the UI image shows completion of an operation when a distance between the detection object and the projection region becomes equal to or less than a threshold value.

5. The image projection device according to claim 3, wherein
   the circuitry is configured to generate the UI image such that the UI image shows that menus in a lower layer are gradually expanded as the detection object approaches the projection region when an image of the menus overlapping with a layered structure is displayed in a position corresponding to the detection object within the projection region, and
   the circuitry is configured to generate the UI image such that the UI image shows that all the menus with the layered structure are arranged in a single plane and an operation is completed when a distance between the detection object and the projection region becomes equal to or less than a threshold value.

6. The image projection device according to claim 3, wherein
the circuitry is configured to change the UI image such that the UI image shows that an object displayed in a position corresponding to the detection object within the projection region gradually protrudes toward the user as the detection object approaches the projection region,
the circuitry is configured to change the UI image such that the object moves so as to follow movement of the detection object moving within a region in the instruction region when the distance between the detection object and the projection region becomes equal to or less than a threshold value, and
the circuitry is configured to generate the UI image such that the UI image shows the object that has stopped following the movement of the detection object when the distance between the detection object and the projection region becomes larger than the threshold value.

7. The image projection device according to claim 3, wherein
the circuitry is configured to generate the UI image such that the UI image shows that an object protrudes toward the user when the object is displayed in a position which is within the projection region and corresponds to the detection object and a distance between the detection object and the projection region is equal to or less than a threshold value,
the circuitry is configured to then generate the UI image such that the UI image shows that the object moves so as to follow movement of the detection object moving in a region within the instruction region in which the distance between the detection object and the projection region is larger than the threshold value, and
the circuitry is configured to generate the UI image such that the UI image shows that the object stops following the movement of the detection object and returns to a non-protruding state when the distance between the detection object and the projection region again becomes equal to or less than the threshold value.

8. The image projection device according to claim 1, wherein a projection distance representing a distance between the projection port from which projection light is emitted and the projection object is set to a value smaller than a prescribed reference value.

9. An image projection system, comprising:
an image projection device configured to project an image on a projection object; and
an information processing device connected to the image projection device, wherein the information processing device includes
a projection port from which projection light to project the image is emitted;
an image sensor configured to capture an image of an object space corresponding to the projected image, the object space including an upper edge of a projection region that indicates a region on which the image is projected on a projection object, the image sensor being disposed in a position different from the projection port and
circuitry configured to
calculate a distance between the image projection device and the projection object using an amount of movement of the projection region in the image captured by the image sensor, the amount of movement changing depending on the distance between the image projection device and the projection object;
calculate a size of the projection region using the calculated distance;
decide, as an instruction region in which an instruction motion of a user is performed, a region within the object space, using the calculated size of the projection region;
detect a detection object present within the decided instruction region;
recognize the instruction motion of the user based on detection of the detection object and
generate an output corresponding to the instruction motion recognized within the object space from the instruction motion and the image projected by the image projection device.

10. The image projection system according to claim 9, wherein the circuitry of the information processing device is further configured to
generate a UI image to be presented to the user according to the instruction motion performed within the instruction region;
combine an input video image and the generated UI image to generate a composite image; and
project the generated composite image on the projection object.

11. The image projection system according to claim 10, wherein the circuitry of the information processing device is configured to generate the UI image according to a positional relation between the detection object and the projection region.

12. The image projection system according to claim 11, wherein
the circuitry of the information processing device is configured to generate the UI image such that the UI image shows that a button is gradually pressed as the detection object approaches the projection region when an image of the button is displayed in a position corresponding to the detection object within the projection region, and
the circuitry of the information processing device is configured to generate the UI image such that the UI image shows completion of an operation when a distance between the detection object and the projection region becomes equal to or less than a threshold value.

13. The image projection system according to claim 11, wherein
the circuitry of the information processing device is configured to generate the UI image such that the UI image shows that menus in a lower layer are gradually expanded as the detection object approaches the projection region when an image of the menus overlapping with a layered structure is displayed in a position corresponding to the detection object within the projection region, and
the circuitry of the information processing device is configured to generate the UI image such that the UI image shows that all the menus with the layered structure are arranged in a single plane and an operation is completed when a distance between the detection object and the projection region becomes equal to or less than a threshold value.

14. The image projection system according to claim 11, wherein
the circuitry of the information processing device is configured to change the UI image such that the UI image shows that an object displayed in a position corresponding to the detection object within the projection region gradually protrudes toward the user as the detection object approaches the projection region, the circuitry of the information processing device is configured to change the UI image such that the object moves so as to follow movement of the detection object moving within a region in the instruction region when the distance between the detection object and the projection region becomes equal to or less than a threshold value, and the circuitry of the information processing device is configured to generate the UI image such that the UI image shows the object that has stopped following the movement of the detection object when the distance between the detection object and the projection region becomes larger than the threshold value.

15. The image projection system according to claim 11, wherein the circuitry of the information processing device is configured to generate the UI image such that the UI image shows that an object protrudes toward the user when the object is displayed in a position which is within the projection region and corresponds to the detection object and a distance between the detection object and the projection region is equal to or less than a threshold value, the circuitry of the information processing device is configured to then generate the UI image such that the UI image shows that the object moves so as to follow movement of the detection object moving in a region within the instruction region in which the distance between the detection object and the projection region is larger than the threshold value, and the circuitry of the information processing device is configured to generate the UI image such that the UI image shows that the object stops following the movement of the detection object and returns to a non-protruding state when the distance between the detection object and the projection region again becomes equal to or less than the threshold value.

16. A control method, comprising:

emitting a projection light from a projection port to project an image;

capturing, by an image sensor, an image of an object space corresponding to the projected image, the object space including an upper edge of a projection region that indicates a region on which the image is projected on a projection object, the image sensor being disposed in a position different from the projection port;

calculating a distance between the projection port and the projection object using an amount of movement of the projection region in the image captured by the image sensor, the amount of movement changing depending on the distance between the projection port and the projection object;

calculating a size of the projection region using the calculated distance;

deciding, as an instruction region in which an instruction motion of a user is performed, a region within the object space, using the calculated size of the projection region;

detecting a detection object present within the decided instruction region recognizing the instruction motion of the user based on detection of the detection object; and generating an output corresponding to the instruction motion recognized within the object space at the recognizing from the instruction motion and the image projected by the image projection device.

17. The image projection device according to claim 1, wherein the circuitry calculates the size of the projection region using the calculated distance between the image projection device and the projection object, a gradient of the projection light incident on the projection region, and an intercept of a line representing the projection light projected from the projection port and incident on the projection region.

* * * * *